April 23, 1929.  W. E. BECK  1,710,467
MACHINE FOR MAKING BOX PARTITIONS
Filed May 31, 1927   9 Sheets-Sheet 1
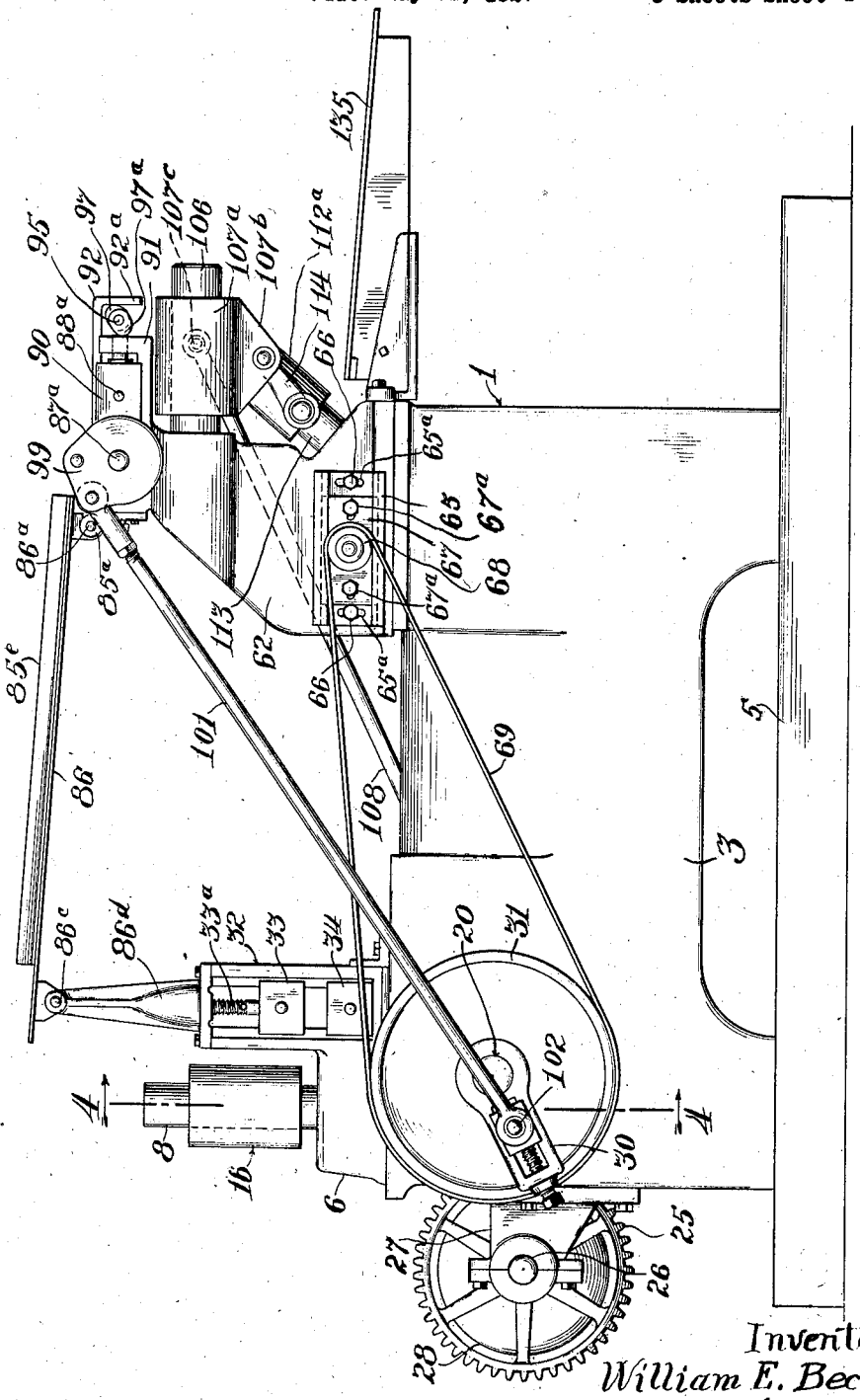
Fig. 1.
Inventor:
William E. Beck
Attorney.

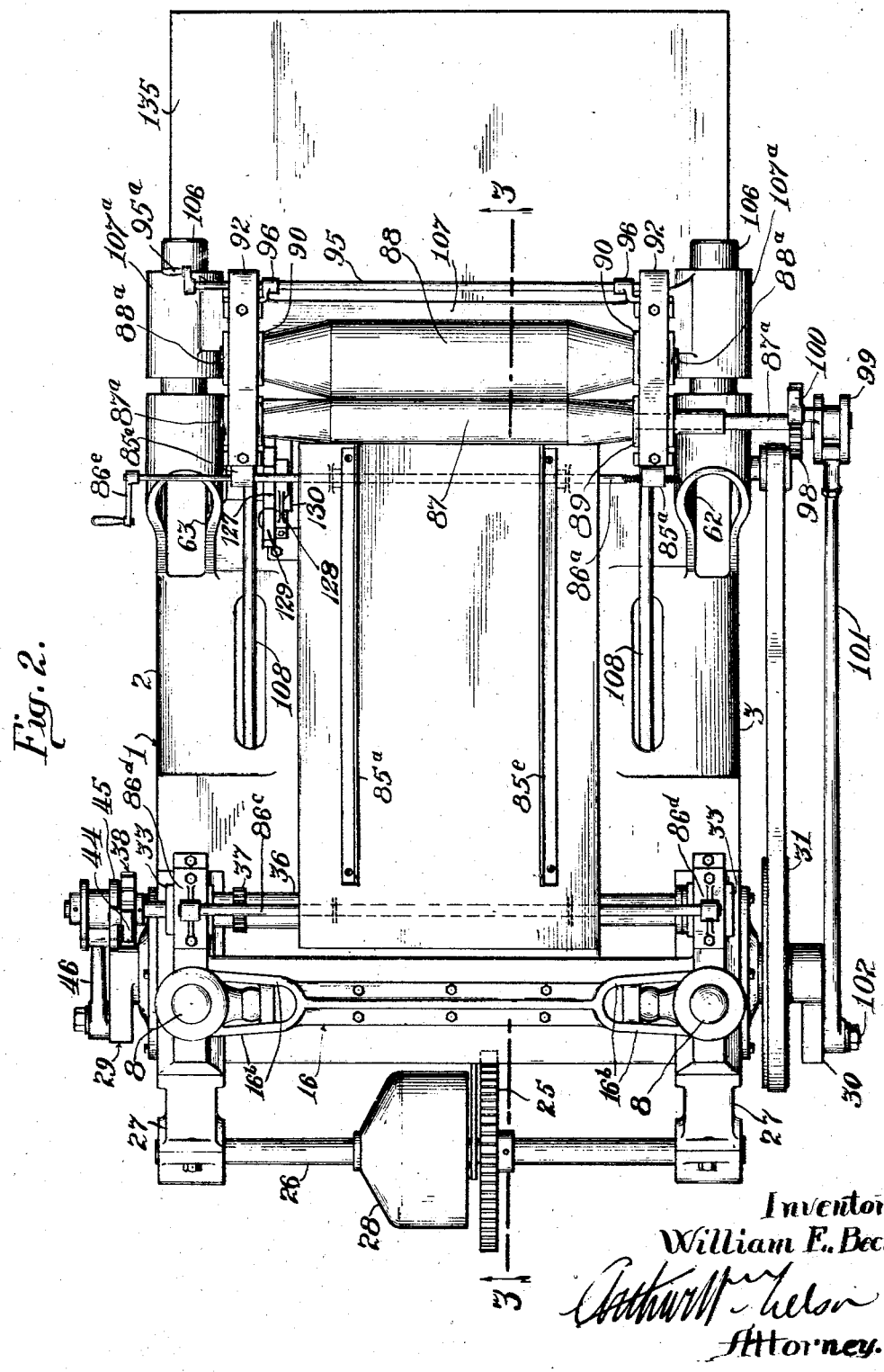

April 23, 1929.    W. E. BECK    1,710,467
MACHINE FOR MAKING BOX PARTITIONS
Filed May 31, 1927    9 Sheets-Sheet 3
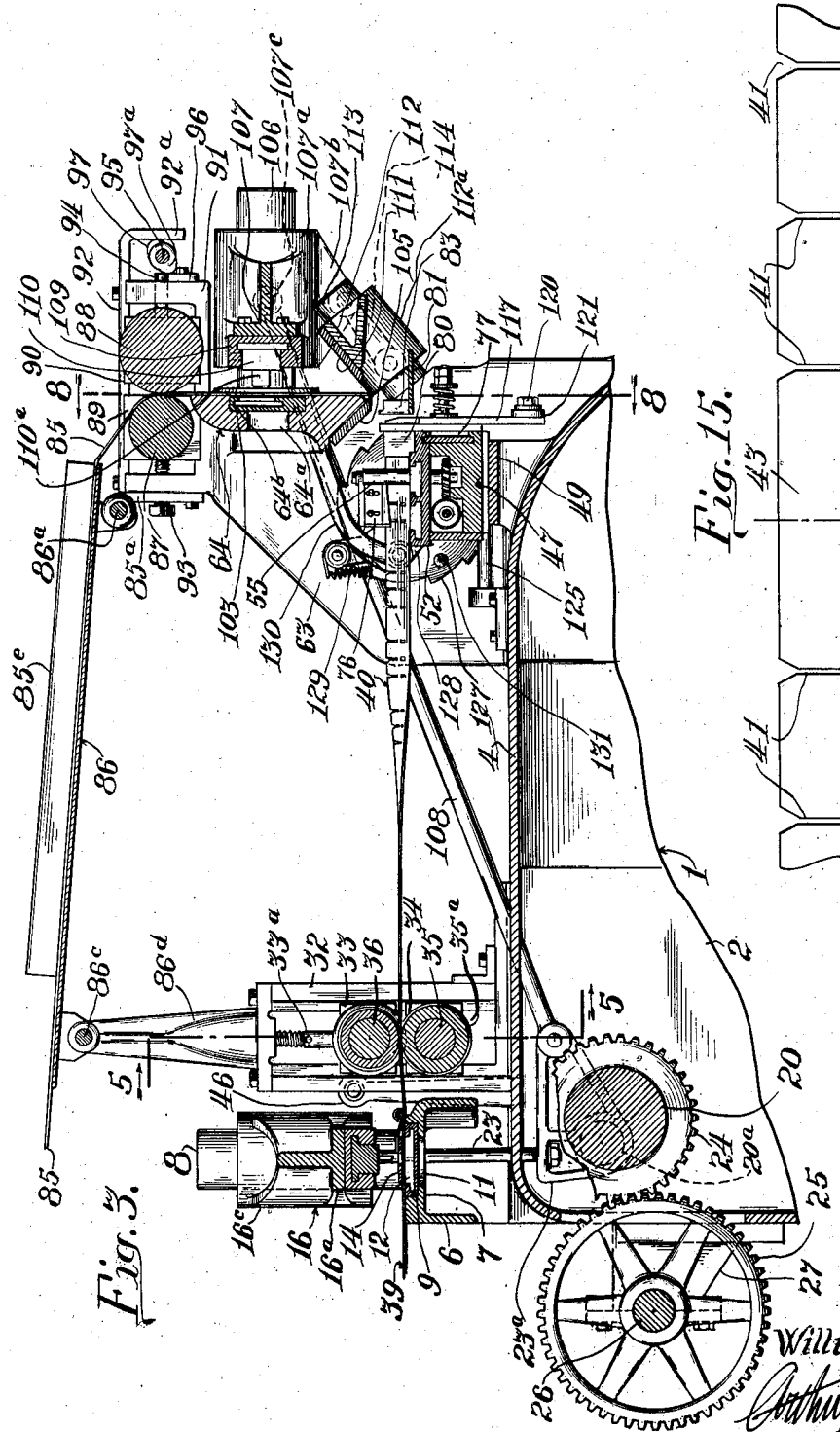
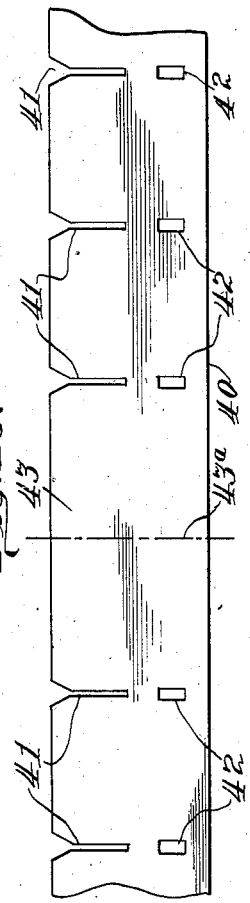
Inventor.
William E. Beck
Attorney.

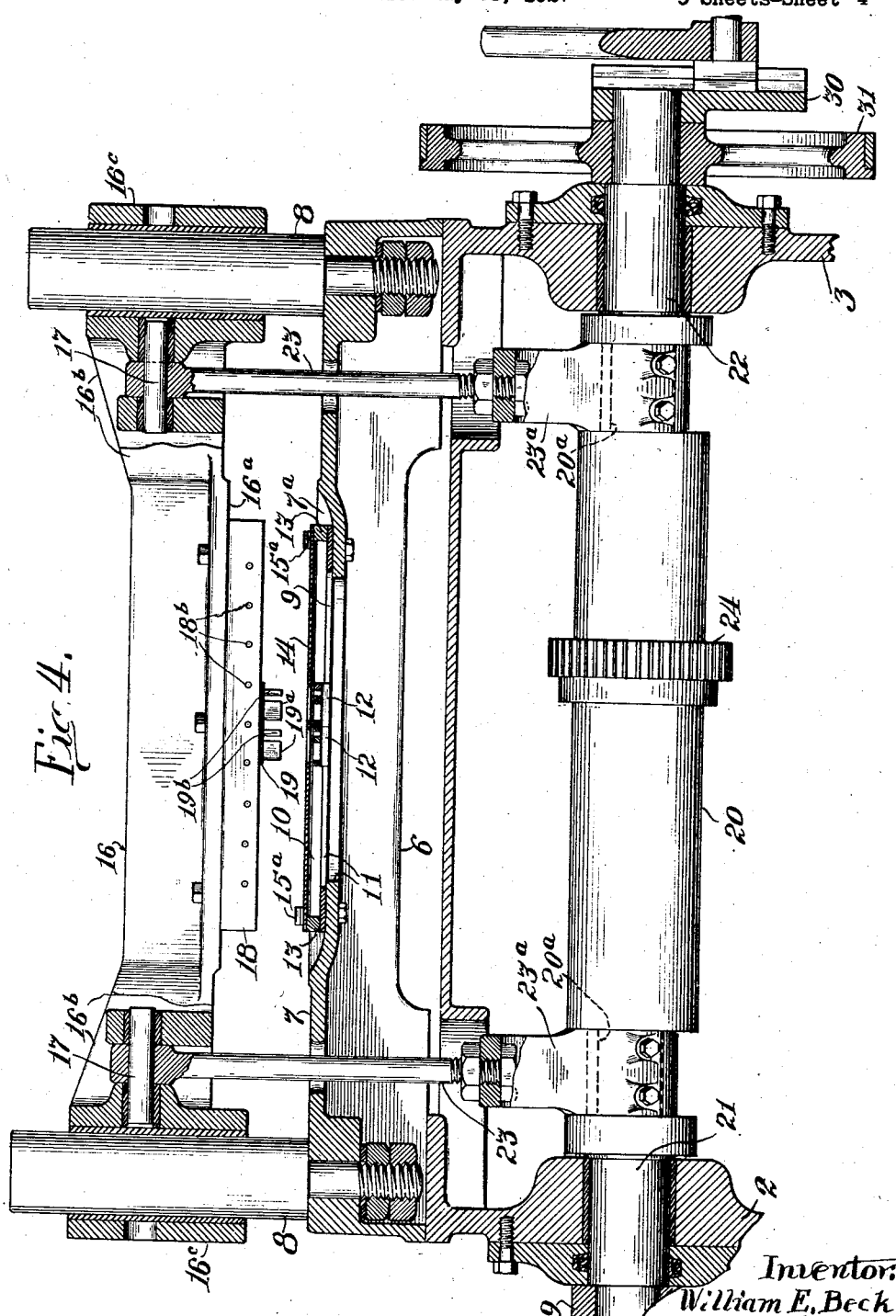

April 23, 1929.  W. E. BECK  1,710,467
MACHINE FOR MAKING BOX PARTITIONS
Filed May 31, 1927  9 Sheets-Sheet 5
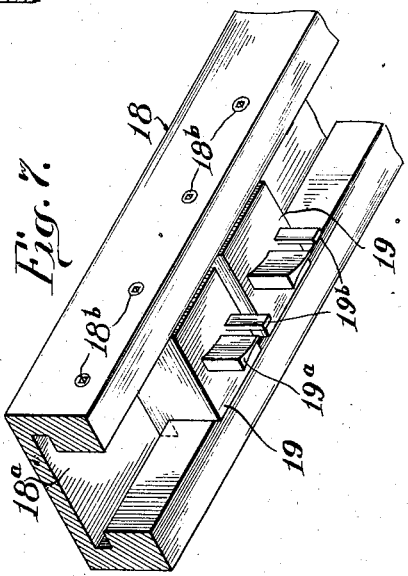
Inventor:
William E. Beck
Arthur W. Nelson
Attorney.

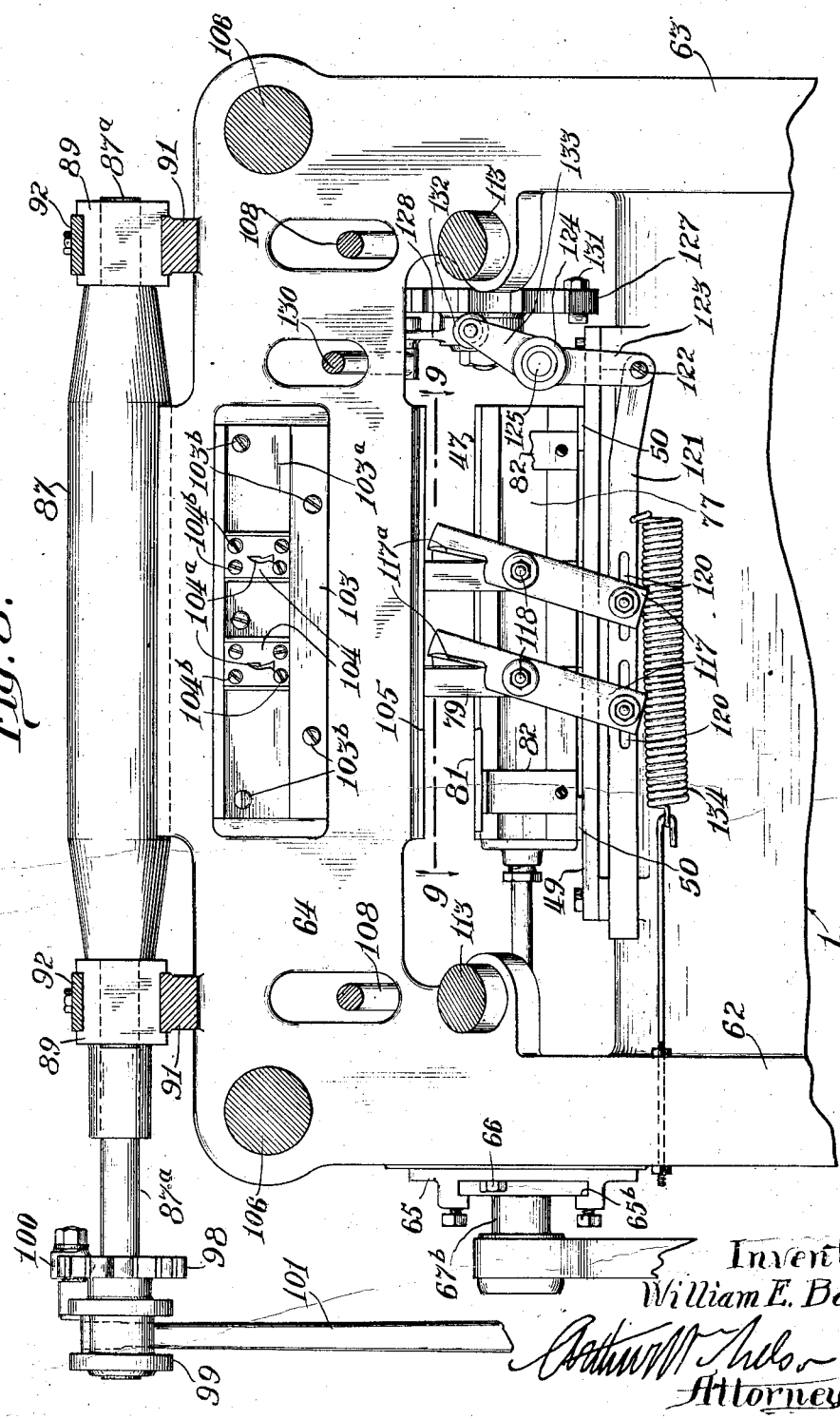

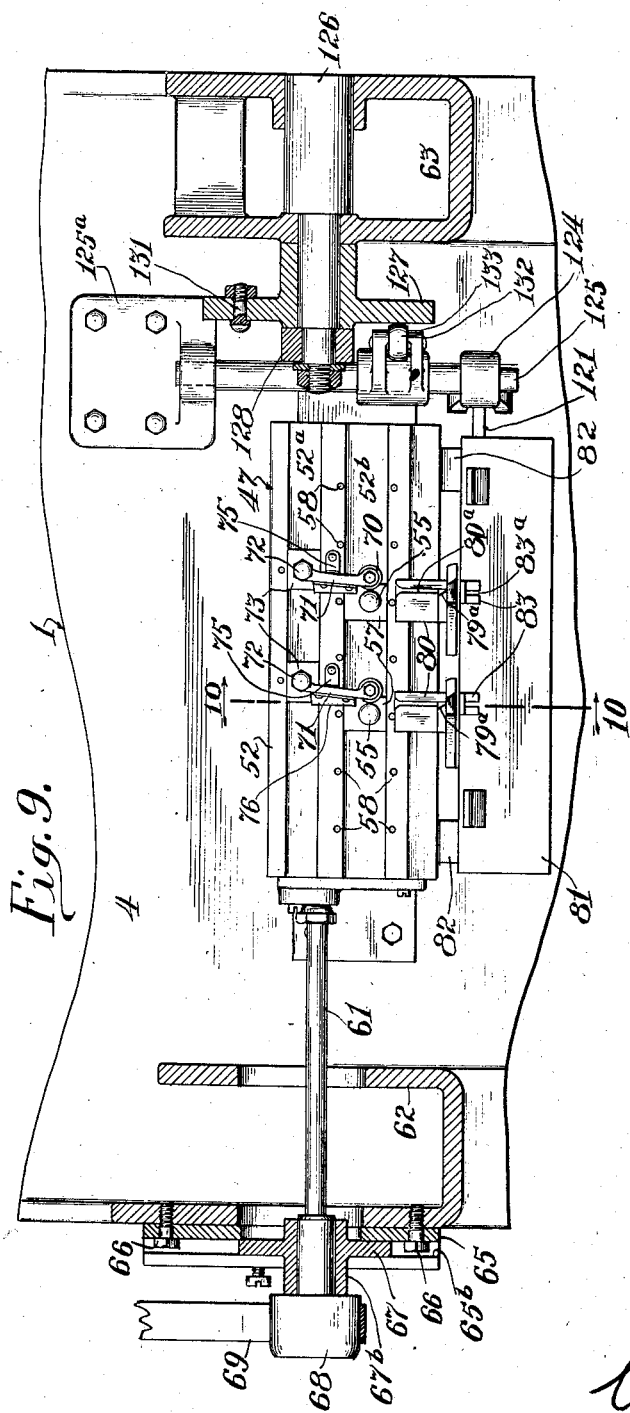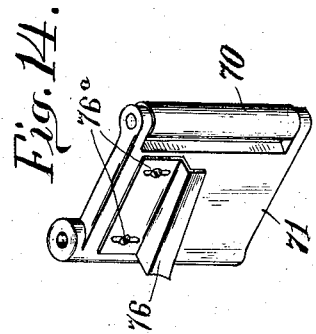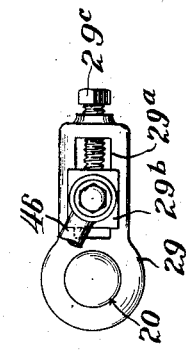

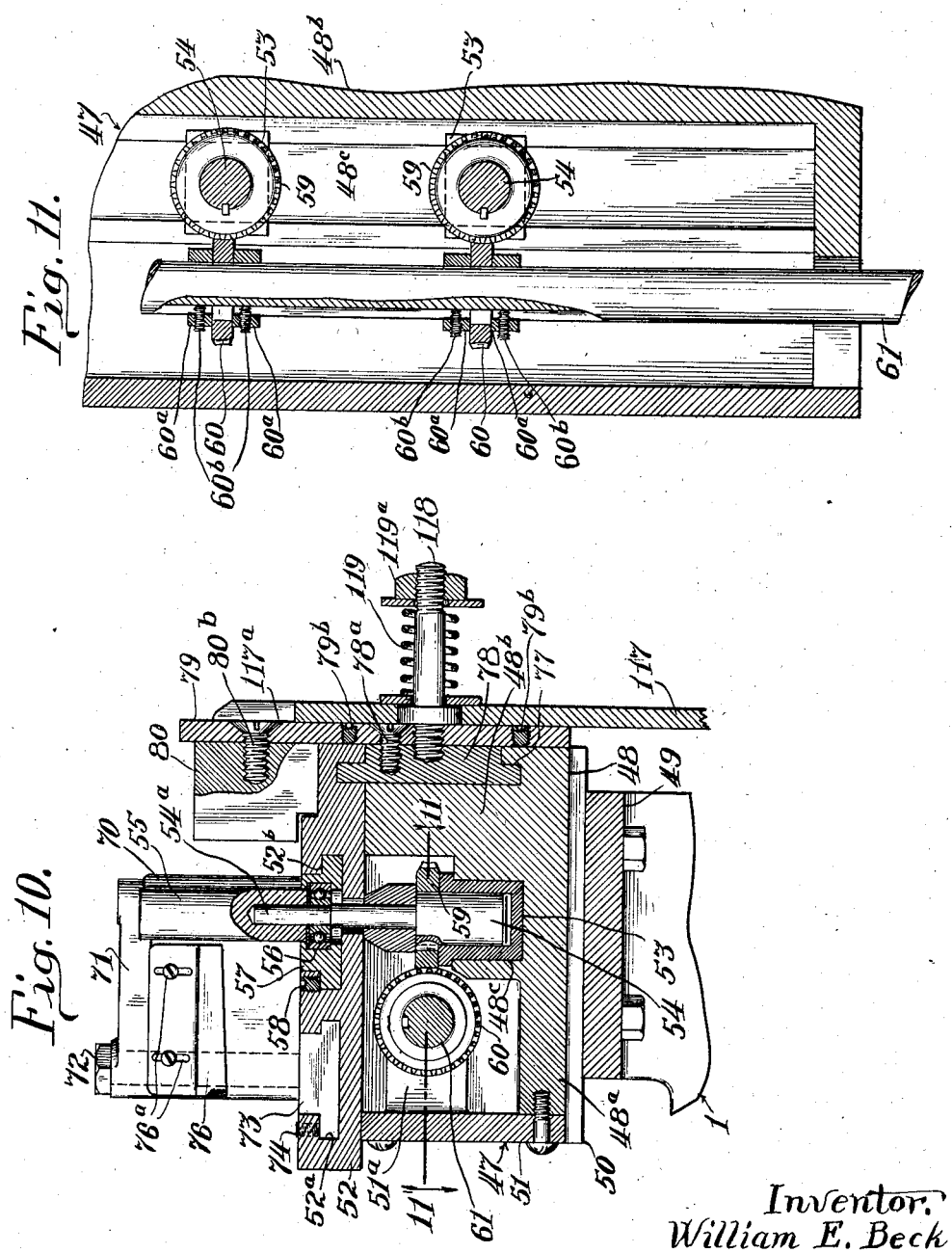

April 23, 1929.  W. E. BECK  1,710,467
MACHINE FOR MAKING BOX PARTITIONS
Filed May 31, 1927  9 Sheets-Sheet 9
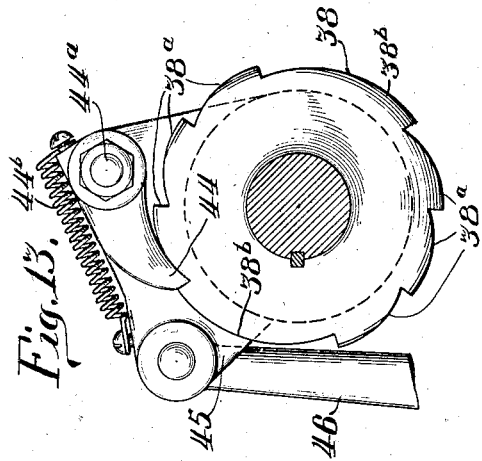
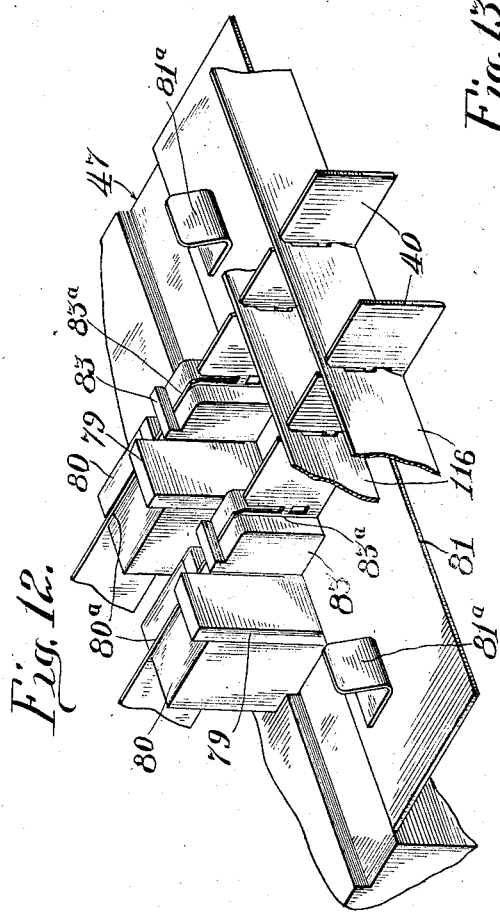
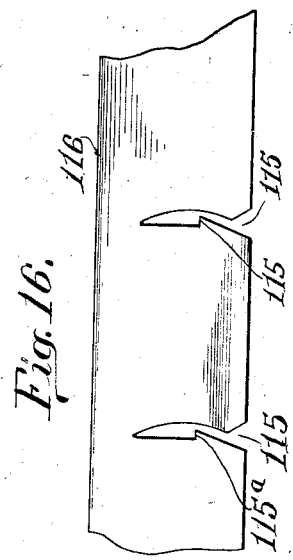
Inventor
William E. Beck
Attorney Patented Apr. 23, 1929.

1,710,467

UNITED STATES PATENT OFFICE.

WILLIAM E. BECK, OF CHICAGO, ILLINOIS, ASSIGNOR, BY MESNE ASSIGNMENTS, TO F. C. TRAVER PAPER COMPANY, OF CHICAGO, ILLINOIS, A CORPORATION OF ILLINOIS.

MACHINE FOR MAKING BOX PARTITIONS.

Application filed May 31, 1927. Serial No. 195,197.

This invention relates to improvements in machines for making partitions for boxes and cartons and the like and it consists of the matters hereinafter described and more particularly pointed out in the appended claims.

The machine is of that type adapted to simultaneously operate upon two different bands or strips of relatively stiff paper;
one of which is comparatively narrow and passes between suitable dies and punches, to be operated thereon at predetermined intervals and thereafter slit longitudinally into ribbons so that the punched openings are disposed in what afterwards becomes the top edges thereof. While the first band is thus being operated upon, the other band which is usually much wider, is fed downwardly toward said ribbons in a plane at a right angle to the top edges thereof, and the advancing edge portion of said other band is punched to provide suitably spaced notches or openings therein which register and interlock with those in the ribbons, after which said edge portion of the band thus interlocked with the ribbons is cut transversely to provide one of the cross bars of the partition. After one cross bar has been positioned with respect to the ribbons the ribbons are fed forward the proper distance to receive another cross bar and so on, enough to make up the desired size of partition. After the desired number of cross bars have been assembled, with the ribbons, said ribbons are again fed forward and are then severed transversely and the finished partition is discharged from the machine, ready to be expanded or opened and placed in a box or carton of the proper size therefor.

The primary object of the invention is to simplify and improve the construction of the machine whereby it may be readily adjusted to produce partitions of different depths and sizes, without the necessity of substantially dismantling the machine and changing the feed rolls for the various strips, as is now the practice.

A further object of the invention is to provide an improved punch and die arrangement which permits a ready adjustment thereof to bring them into the desired position and to provide a novel means for readily adjusting the amount of peripheral movement and consequent feed of the feed rolls.

Still another object of the invention is to provide an improved ribbon cut off, readily adjustable to accommodate the adjustment of the ribbon guides and feeding means for the ribbons.

My invention consists generally in a machine of such character that the above mentioned objects of the invention, together with others, as well as the many advantages thereof that will hereinafter appear are attainable; and my invention will be more readily understood by reference to the accompanying drawings, which illustrate what I consider at the present time to be the preferred embodiment thereof.

In said drawings:

Fig. 1 is a view in side elevation of a machine for making box or carton partitions embodying the preferred form of my invention.

Fig. 2 is a top plan view of the machine shown in Fig. 1.

Fig. 3 is a longitudinal vertical section through the machine as taken on the line 3—3 of Fig. 2.

Fig. 4 is a transverse vertical sectional view on an enlarged scale through the front end of the machine, the plane of the section being indicated by the line 4—4 of Fig. 1.

Fig. 5 is a vertical sectional view through the combined slitting and feed rolls of the machine, the plane of the section being taken on the line 5—5 of Fig. 3.

Figs. 6 and 7 are detail perspective views of portions of the coacting die and punch respectively for punching spaced openings in one of the paper bands before it is slit lengthwise to form the ribbons.

Fig. 8 is a vertical sectional view through the rear end of the machine as taken on the line 8—8 of Fig. 3.

Fig. 9 is a horizontal sectional view as taken on the line 9—9 of Fig. 8.

Fig. 10 is a vertical detail sectional view through the rear end of the machine on a further enlarged scale as taken on the line 10—10 of Fig. 9.

Fig. 11 is a horizontal detail sectional view as taken on the line 11—11 of Fig. 10.

Fig. 12 is a detail perspective view of that part of the machine wherein the cross bars are assembled with the ribbons and which will be more fully referred to later.

Fig. 13 is a detail sectional view as taken on the line 13—13 of Fig. 5 and illustrates a certain pawl and ratchet mechanism to be more specifically referred to later.

Fig. 14 is a perspective view of a certain ribbon feed and guide block which will also be more specifically referred to later.

Fig. 15 is a view in elevation of a fragment of a ribbon formed by my improved machine and constituting a part of the finished partition.

Fig. 16 is a view in elevation of a fragment of a cross bar formed by my improved machine and constituting the other part of the finished partition.

Fig. 17 is a detail view in elevation of a certain crank arm and connecting rod arrangement embodied in my improved machine and which will be more fully referred to later.

In general the improved machine includes a main frame at the front end of which is located a vertically reciprocating punch to coact with a die, a narrow strip of paper being fed between the punch and die to be suitably punched thereby. Just to the rear of said punch and die is located a pair of transversely extending, horizontally disposed, step by step rotatable, combined slitting and feed rolls, which feed the strip through the punch and die with a pulling action and slit the punched strip longitudinally to form the ribbons for the partition. The ribbons pass between these rolls in a horizontal plane and are each next engaged by laterally spaced sets of vertically disposed feed rolls, near the rear of the main frame, each ribbon being twisted, in its length, to pass through the last mentioned rolls with its edge disposed in a vertical plane, and with certain of the notches or punches thereof opening through the top thereof.

At the rear end of the machine above said laterally spaced sets of vertically disposed ribbon feed rolls, is a pair of transversely extending, horizontally disposed, step by step actuated feed rolls between which a wider strip of paper passes, said strip being fed to said rolls from a platform or table extending forwardly therefrom. This last named strip passes downwardly from these feed rolls in between coacting punch and dies, the punches reciprocating longitudinally of the frame. Said punches and dies operate on the advancing edge of the wider strip too produce certain openings therein, spaced in accordance with the spacings between the ribbons, said edge of the wider strip afterward becoming the cross bar strip of the finished box partition. This advancing edge of the cross bar strip is fed beyond the punches and dies and passes between suitable cutting blades and into assembled relation with the ribbons after which the blades coact to sever said strip to provide a cross bar and the ribbons are again advanced into position to have another cross bar assembled therewith. When a suitable number of cross bars have been assembled with the ribbons, said ribbons are severed by suitable knives, and a finished assembled box partition is discharged from the machine.

Referring now in detail to that embodiment of the invention illustrated in the accompanying drawings, 1 indicates as a whole the main frame of the machine which includes upright side frame members 2 and 3 respectively, connected together in suitable spaced relation by a horizontal bed plate 4. Preferably the parts of the main frame just described are made as an integral casting resting upon a base 5 but as will be apparent, said parts may also be in the form of separate elements suitably secured together.

At the front end of the main frame, in a plane above the bed 4, is a transversely extending bridge bar or plate 6 of substantially inverted U-shaped or channel cross section including a top wall 7. Rising from each end of said bridge plate is a heavy upright guide post 8 secured thereto in any suitable manner. In the top wall 7 of said bridge plate is provided a shallow groove or recess 7ª in which is seated a die holding plate 9, having an upwardly opening undercut groove 10 therein, said die holding plate and top wall 7 having elongated registering openings 11—11 through which the punchings from the paper strip are discharged as will later appear. 12—12 indicates dies arranged in the groove 10 in a manner permitting a lateral adjustment thereof so that said dies may be disposed therein to operate upon ribbon strips of different widths. Near each end of the die holding plate is a block 13, and to each block is secured the associated end of a stripper plate 14 as best shown in Fig. 6. Said stripper plate has the usual opening 13ª therein, for the passage of the punches coacting with the dies 12—12. Just rearward of the die holding plate 9 is a rod 15 supported by arms 15ª secured to the ends of the stripper plate above the blocks 13.

16 indicates a punch carrying cross head, including a flat bottomed intermediate body portion 16ª having pairs of spaced arms 16ᵇ at its ends, each pair of arms terminating in an upright bearing sleeve 16ᶜ having a sliding guiding bearing on an associated upright post 8. Between the arms of each pair of arms 16 is provided a wrist pin 17, journalled at its ends in an associated sleeve and end part of the body portion 16ª. On the flat bottom of said body portion is fixed a punch carrying member 18 and in the bottom surface thereof is formed an under cut groove 18ª as best shown in Fig. 7. In this groove is located a plurality of blocks 19 each carrying spaced punches 19ª—19ᵇ adapted to coact with the die 12. These die blocks may be adjusted longitudinally of the member 18 to register with the dies 12 and may be locked in adjusted position by means of set screws 18$^b$.

Means is provided for vertically reciprocating the cross head 16 so that the punches move toward and into operative relation with respect to the dies and then away therefrom and such means is as follows: 20 indicates a transversely extending horizontal shaft arranged below the bridge plate 6. Said shaft is of substantial diameter and has reduced end parts 21 and 22 which are journalled in suitable bearings in the side frames 2 and 3 respectively, as best shown in Fig. 4. Adjacent each end part of reduced diameter, said shaft is provided with eccentrics 20$^a$—20$^a$, each receiving a strap 23$^a$ on the bottom end of a connecting rod 23. Each connecting rod extends upwardly through suitable openings in the bed 4 and bridge plate 6 (see Fig. 4) and its top end is operatively connected to an associated wrist pin 17. The shaft 20 constitutes the main shaft from which the other mechanisms of the machine are driven and it will hereinafter be referred to as the "main shaft". On this shaft, between its ends is fixed a gear 24 which meshes with the gear 25 on the parallel power shaft 26 journalled in bearing blocks 27 fixed to and extending forwardly from the respective side frame members 2 and 3. On this shaft is a combined pulley and clutch 28 driven by a belt (not shown) from a suitable motor or engine. On the shaft end 21 outside of the frame member 2 is fixed a crank arm 29 and on the shaft end 22 outside of the frame member 3 is a crank arm 30, while between said frame member 3 and crank arm 30, a pulley 31 is fixed to said shaft end, the purpose of which will later appear.

Just to the rear of the punch and die structure heretofore described is provided a set of combined feed and slitting rolls, which act to pull a substantially narrow strip of paper through and between said punches and dies in a step by step manner, whereby said strip is punched at desired intervals and is thereafter slit into ribbons. Such means is as follows: Rising from each side frame member 2 and 3 respectively, just to the rear of each upright post 8 is an upright open bearing block standard 32. In each standard, a pair of top and bottom bearing blocks 33—34 are arranged for a vertical guided adjustment. In the bottom boxes of both standards is journalled a shaft 35 and in the top boxes of both standards is journalled a second shaft 36. On said shafts in suitable position with respect to the punch and die blocks before mentioned is fixed a coacting set of circular cutters 35$^a$ and 36$^a$ respectively. The cutters 35$^a$ are spaced from each other by collars 35$^b$ while the cutters 36$^a$ are spaced from each other by collars 36$^b$, the collars 35$^b$ and 36$^b$ having peripheral engagement. When it is desired to adjust the position of the cutters on said shaft with respect to said punches and dies, the shafts must be removed and collars of a greater or less length substituted for those shown. Said shafts 35—36 are geared together to rotate in opposite directions as at 37 in Fig. 5.

The bottom bearing blocks 34—34 engage upon helical springs 34$^a$ in the bottom end of the associated bearing standard 32 while an adjusting screw 33$^a$ is interposed between each top bearing block 33 and the closed top end of the associated bearing standard. By this means the desired tension on the feed rolls so far as the peripheral engagement of the collars 35$^b$ and 36$^b$ is concerned may be accurately and evenly produced. The left hand end of the top shaft 36 extends beyond its bearing box 33, a suitable distance and secured thereto is a ratchet 38 by which a step by step rotative movement is imparted to said feed rolls 35 and 36 in opposite directions.

39 indicates a strip of paper of a width sufficient to provide the desired number of ribbons desired in the finished partition. Said strip which is fed from a suitable supply roll (not shown) passes under the stripper plate 14 and under the guide rod 15 and in between the collars 35$^b$ and 36$^b$ on the shafts 35 and 36. As it passes under the stripper plate over the dies 12—12, the punch operates thereon to punch openings in the strip 39, one for each cross bar to be used in the finished partition and as said strip passes through the slitting and feeding rolls it is slit longitudinally into ribbons 40. Those parts of the strip thus punched out fall through the openings 11—11 in the die plate and top wall 7 of the bridge plate 6 to be discharged from the machine. The punched openings in the strip after slitting provide notches or recesses 41 in one margin of the ribbon together with an opening 42 near, but within, the other margin of the ribbon as best shown in Fig. 15. It is apparent from said Fig. 15 that the notches 41 and 42 are arranged in sets or pluralities; each spaced a distance apart to receive the cross bars as will later appear and that one set is spaced from the next adjacent set a greater distance as indicated at 43 in said Fig. 15. This portion of greater distance is equal to the distance between alternate notches 41 and said portion is subsequently severed along the dotted lines 43$^a$ to provide the ends of the finished ribbons. This spacing of the notches is taken care of by the arrangement of the teeth on the ratchet 38 which is best shown in Fig. 13.

The ratchet 38, which as before described, is fixed to the left hand end of the feed roll shaft 36 as two sets of teeth 38ª and 38ᵇ respectively. Associated with said ratchet is a pawl 44 pivoted at 44ª on a rocking plate 45 loose on the end of said shaft 36 outwardly beyond the ratchet. A spring 44ᵇ is so connected to said pawl and plate as to hold the pawl in engagement with the periphery of the ratchet. Said plate 45 is actuated by a rod 46 connected to the crank arm 29 as best shown in Fig. 2. As the plate 45 is rocked, the pawl 44 is moved in one direction a distance equal to the longer tooth 38ᵇ which is a little less in arcuate length than the distance between two teeth 38ª. Therefore, as the pawl is moved clockwise in Fig. 13, it will click over the first tooth and almost to the second. When said pawl is moved counterclockwise it will move with a lost motion until it picks up the first tooth and then move it a distance equal to that of a tooth which feeds the strip 39 a distance equal to the spacing between the notches 41 in the ribbon 40. When the pawl 44 is acting on the longer tooth 38ᵇ there is no lost motion so that the feed roll is fed a distance equal to the spacing between the notches 41 on each side of the ribbon portion 43.

The connection between the crank arm 29 and connecting rod 46 is best shown in Fig. 17. In said figure the crank arm has a slot 29ª therein in which a crank pin block 29ᵇ to which the rod 46 is connected, has sliding guiding bearing, said block being adjusted by means of a set screw 29ᶜ threaded in the end of said arm 29. Thus when ribbons are desired wherein the distance between said notches 41 are greater or less than that shown, it is not necessary to change the cutters 35ª—36ª and collars 35ᵇ and 36ᵇ as heretofore but only to remove the ratchet 38 and substitute one of proper diameter and spacing between the teeth thereof and change the crank pin block 29ᵇ accordingly. When a greater distance between the notches 41 is desired in such ribbons, a ratchet of larger diameter would be employed but with the same tooth arrangement as before and the crank pin block 29ᵇ would be adjusted to give a longer throw to the pawl. If a lesser distance between the notches 41 is desired in such ribbons a ratchet of smaller diameter and still with the same tooth arrangement would be employed and the crank pin block 29ᵇ would be adjusted to give a smaller throw to the pawl 44. As the ratchet 38 is located on the proximate end of the shaft 36 outside the standard 32, this substitution may be easily made without the necessity of a substantial dismantling of this end of the machine. It is to be understood that in operation of the machine, the collars 35ᵇ—36ᵇ will pull the strip 39 through the punching mechanism in a step by step manner and said strip is slit into the ribbons 40 by the cutters 35ª—36ª at this same time. After the ribbons leave the feed and slitting rolls they pass toward the rear end of the machine to what I term a "feed box" indicated as a whole at 47 in Figs. 3 and 10. During their passage to the feed box the ribbons are twisted so as to bring their edges into a vertical plane, with the notches 41 in all the ribbons facing upwardly.

The feed box 47 includes a casting 48 of substantially L shaped cross section extending transversely of the main frame and having a flat bottom wall 48ª and an upright rear wall 48ᵇ. Said casting is supported upon a transverse bed plate 49 made integral with the main frame 1 and a flat spacer plate 50 is interposed between the bottom of said casting and the top of the bed plate. Said spacer plate is made removable to permit the substitution of such other spacer plate as will correctly position said casting 48 in the desired plane above the bed plate. Such an adjustment is necessary in changing the machine to make up partitions of different heights. Associated with said casting is an upright front plate 51 and a horizontal top plate 52 providing the hollow box like structure of the feed box, said plates being suitably fixed to the casting.

In the top surface of the top plate are provided front and rear, undercut, upwardly opening grooves 52ª—52ᵇ extending the full length of the plate, the latter groove opening into the interior of the feed box. In the bottom wall of the casting 48 in line with the undercut grooves 52ᵇ is an upwardly opening groove 48ᶜ. Slidable in the groove 48ᶜ is a plurality of rectangular bearing blocks 53 in each of which is journalled an upright spindle 54. The top end 54ª of the spindle which is reduced in diameter extends up through the groove 52ᵇ and has fixed thereto a roll 55. Said reduced part 54ª also has an antifriction bearing 56 in a block 57 slidable in the groove 52ᵇ so as to be longitudinally adjustable therein, a set screw 58 locking the block in the desired position in said groove. On the spindle 54 just above the bearing block 53 is fixed a worm pinion 59 which meshes with a worm pinion 60 having a sliding key connection on a horizontal transverse shaft 61 journalled in ears 51ª on the rear side of the front plate 51. On each side of each pinion 60 is a collar 60ª which is so connected to the shaft 61 as to prevent endwise displacement of said pinion. Said collars carry set screws 60ᵇ (see Fig. 11) for locking them to said shaft and said set screws may be loosened when it is desired to adjust the position of the worm pinions 60 on the shaft 61.

The shaft 61 projects at its right hand end out through an upright hollow member 62 rising from the side frame member 3 at the rear end thereof, there being a similar upright hollow member 63 rising from the side frame member 2 and connected thereto by a cross member 64 preferably made integral therewith. On the outer surface of the upright member 62 is a horizontal plate 65 having vertical end slots 65$^a$ through which bolts 66 extend to be threaded into said member 62. This bolt and slot connection permits said plate to be adjusted vertically within certain limits on said member 62. Said plate 65 is undercut longitudinally on its outer face to provide a guide groove 65$^b$ in which a plate 67 having a bolt and slot connection 67$^a$ with the plate 65 is located so as to be adjusted thereon. The plate 67 has a bearing sleeve 67$^b$ in which the end of the shaft 61 has bearing. This construction permits an adjustment of the axial position of the shaft when necessary. To the extremity of this shaft 61 outside the sleeve 67$^b$ is fixed a small pulley 68 driven by a belt 69 from the pulley 31 on the end 22 of the main shaft 20. It is apparent from the foregoing that the rollers 55 which are capable of being adjusted into the desired position with respect to the groove 52$^b$ in the feed box 47 are driven at high speed continuously in one direction through the gearing and associated parts just described.

Associated with each roller 55 is an upright tension roller 70. Said tension roller is journalled in the bifurcated rear end of an upright plate 71, the front end of which is pivoted by a bolt 72 to a block 73 arranged in the groove 52$^a$ in the top plate 52. This block is longitudinally adjustable in said groove into proper relation with respect to the block 57 in the groove 52$^b$ and is locked in the desired adjusted position by a set screw 74 taking through a fixed part of said top plate as shown in Fig. 10. A leaf spring 75 (see Fig. 9) removably fixed to that portion of the plate 52 between the grooves 52$^a$—52$^b$ engages the left hand side of the plate 71 to bring the roller 70 into yielding engagement with the associated roller 55. On the other side of the plate is a vertically adjustable guide member 76 under which the top edge of the ribbon 40 is inserted to be guided thereby between the rollers 55 and 70 respectively. The guide member 76 has a vertical slot and screw connection 76$^a$ with said plate 71 so as to be adjustable to take care of ribbons 40 of different widths. As before stated the rollers 55 are continuously rotating and these rolls act as a secondary ribbon feed in connection with the collars 35$^b$—36$^b$. In this manner, those twisted portions of the ribbons 40 between the said collars and rolls are maintained taut against sagging and at the same time are presented in the proper position to receive certain cross bars to make up the finished box partition.

The rear face of the feed box wall 48$^b$ and the rear edge of the top plate are so formed as to provide a rearwardly facing undercut groove 77 in which one or more blocks 78 have a slidable guiding bearing. Secured to the rear face of said block 78 is an upright plate 79 to the front face of which is secured a ribbon guide block 80 having a vertical guide slot 80$^a$ adapted to be lined up with that portion of the ribbon issuing from the associated feed rolls 55 and 70 respectively. The plate 79 is secured to the block 78 by a screw 78$^a$ and in the top edge of the plate in line with the guide slot 80$^a$ of the block 80 is a recess 79$^a$ through which the ribbon passes, said plate thus acting as the stationary part of a ribbon severing means as will later appear. In the plate 79 are provided set screws 79$^b$ which so engage fixed parts of the feed box proper as to lock the plate 79 and block 78 in the desired position in the groove 77. Preferably the ribbon guide block 80 is fixed to the plate 79 by a screw 80$^b$.

Spaced rearwardly from the plate 79 is a horizontally disposed platform or shelf 81 supported from the feed box in the desired spaced relation as by brackets 82—82 in Fig. 9. On the front margin of said platform are provided upright ribbon guide blocks 83 each with an upwardly opening slot 83$^a$ therein in line with the slot 80$^a$ of the feed blocks 80 and slots 79$^a$ in the plate 79. These blocks 83 which are so mounted on the platform 81 as to be adjustable along the front margin thereof receive the ribbons after they leave the blocks 80 and plates 79 and guide them in an upright position after they have crossed the space separating the platform 81 from the plates 79, so that the associated cross bars of the partition may be assembled with respect thereto. On said platform near the front edges thereof, are provided upwardly and forwardly inclined cross bar guiding tabs 81$^a$ the purpose of which will be referred to later.

I have referred heretofore to what I term the "cross bar" of the partition which coacts with the ribbons to make up the finished partition. These cross bars are cut from the end of a wide strip of paper 85 fed from a suitable supply roll forwardly of the front end of the machine, the strip being of a width equalling that of the length of a finished cross bar. This strip 85 is supported in a position above the bed 4 of the machine frame, by a table 86 over which it passes rearwardly and is then directed downwardly between a pair of transversely extending front and rear feed rolls 87 and 88 respectively, both arranged with their axes in the same horizontal plane.

The rolls 87—88 have reduced end portions providing shafts 87ᵃ and 88ᵃ respectively, which are journalled in pairs of bearing blocks 89 and 90 respectively. These blocks which are rectangular have guided bearing in an open box like guide 91—91 supported by the cross member 64 previously mentioned. The top of each guide box is covered by a plate 92 bolted thereto and this plate extends rearwardly beyond the guide and is there provided with a downwardly extending leg 92ᵃ which is capable of a slight yielding movement. The blocks 89 in both guides 91—91 for the front feed roll 87 each abut against a set screw 93 in the forward end of the associated guide 91 while the blocks 90 in both guides are each engaged by a stem 94 slidable through the rear end of the associated guide 91. Means are provided to quickly bring the feed rolls 87—88 into a good feeding contact for the cross bar strip 85 and whereby the rolls may be quickly separated for the threading of the strip 85 between them.

95 indicates a shaft arranged parallel with and in the same horizontal plane as that of said feed rolls, said shaft being located between the rear ends of the box guides and said legs 92ᵃ of the plates 92. This shaft is journalled in ears 96 fixed, one on the rear end of each box guide as best shown in Fig. 3. On each end of said shaft is a pair of oppositely disposed cams 97—97ᵃ, one to engage the stem 94 and the other to engage the leg 92ᵃ. When the shaft 95 is turned in one direction the cams will engage the stems, the legs acting to yield slightly and to go under tension and thus hold the feed rolls in contacting relation. The shaft 95 has a crank 95ᵃ (see Fig. 2) for turning the same. When it is desired to release said rolls so that the strip 85 may be threaded therebetween, it is only necessary to turn the shaft in the other direction to bring the cams out of engagement with the box guides and legs after which the rear roll may be moved away from the front roll.

One of said rolls namely the front roll 87 is the driven roll and a step by step movement is imparted thereto as follows: The shaft extension 87ᵃ of said roll at the right hand side of the machine is extended outwardly beyond the side frame 3 where it has fixed to it a ratchet 98. Loose on said shaft is a rocking plate 99 which carries a pawl 100. The plate 99 is rocked by a rod 101 connected at one end to said plate and at the other end to an adjustable crank pin 102 on the crank arm 30 before mentioned. As the ratchet and pawl structure and the adjustable crank pin are of the same structure as that heretofore described for rotating the ribbon strip feed rolls 35—36 it is not thought necessary to describe the same in detail again.

The strip supporting table 86 is inclined downwardly and rearwardly and carries a shaft 86ᵃ journalled at one end in a bracket 85ᵃ on one box guide 91 and the other end of this shaft is threaded into a similar bracket 85ᵃ on the other guide 91. The rear end of said table carries a shaft 86ᶜ arranged in standards 86ᵈ rising from the bearing standards 32 as best shown in Fig. 3. A crank 86ᵉ is fixed on one end of the shaft 86ᵃ which when turned in one direction or other, adjusts said table laterally. As said strip passes over the table 86 it is guided by flanges 85ᵉ as best shown in Fig. 2.

After the strip 85 leaves the feed rolls 87—88 it passes downwardly against the vertical flat rear face of the cross member 64 before mentioned as being made integral with the hollow upright members 62 and 63 respectively. In said cross member is an opening 64ᵃ the rear end of which is formed to provide a shallow recess 64ᵇ in the rear flat face of the cross member 64. In said recess is arranged a die supporting plate 103 with an undercut groove in its rear face. The plate 103 is secured in place by screws 103ᵇ. In the groove 103ᵃ is arranged a plurality of die members 104 each having a die opening 104ᵃ therein. These die members are longitudinally adjustable in the groove and are locked by set screws 104ᵇ as best shown in Fig. 8. The bottom edge of said member 64 is inclined upwardly and forwardly and has secured thereto a fixed cutter bar 105.

Extending rearwardly from each end of the cross member 64 is a horizontally disposed guide post 106 arranged in the plane of the die blocks 105ᵇ and upon which a cross head casting 107 has sliding guided reciprocating movement toward and away from the cross member 64, said cross head having a bearing sleeve 107ᵃ at each end, one engaged on each post 106. Each sleeve 107ᵃ has a depending ear 107ᵇ for a purpose to appear later, and a laterally extending stud 107ᶜ to which is connected one end of a connecting rod 108, the other end of said rod being connected to an associated strap 23ᵃ before mentioned. Through these straps (on the eccentrics 20ᵃ) and connecting rods 108 a reciprocating movement is imparted to the cross head 107 toward and away from the cross member 64.

The front face of the cross head 107 is made vertical and flat and secured thereto is a punch block plate 109 having an under cut groove in its front face. Said groove is adapted to receive a punch block 110 one for each die block 104, each block carrying a punch 110ᵃ to coact with the die opening 104ᵃ. There is a coacting punch and die for each ribbon and said punches are spaced laterally a distance corresponding to that of the ribbons.

Coacting with the fixed cutter bar 105 is a movable cutter bar 111 adapted for a reciprocating movement in an inclined plane approximately at an angle of 45°. Said bar 111 is fixed to a cross head 112 having bearing ears 112ᵃ at its ends, which slide upon posts 113 extending upwardly and rearwardly from the upright hollow members 62—63. The sleeves 112ᵃ are operatively connected to the ears 107ᵇ (of the sleeves 107ᵃ) by short links 114 so that when the cross head 107 moves toward the dies 104, the cross head 112 will move downwardly and forwardly to bring the cutter bar 111 into position with respect to the fixed cutter bar 105, and thus sever the strip 85 along a line coincident with respect to the meeting edges of said cutter bars. When the cross head 107 moves outwardly the cross head 112 will of course move outwardly on the posts 113.

As the advancing edge of the cross bar strip approaches the punches and dies 110 and 104 respectively, said edge which faces downwardly is operated upon to form therein openings 115, which are best shown in Fig. 16. This advancing edge of the strip after it passes the plane of the meeting edges of the cutter bars and before severance thereby is fed to engage the ribbon strips 40, the openings 115 in said edge registering with and entering into locking assembled relation with the notches 41—42 of said ribbons, the openings 115 including shoulders 115ᵃ to lock in the openings 42 of said ribbon strips.

As this advancing edge portion of the strip is moved into assembled relation with the ribbons, its extremity will engage upon the platform 81 which limits its movement. This as before mentioned is before severance of the strip 85 so that, that portion of said strip 85 between said edge and the plane of the punches and dies will have therein, the openings 115 arranged in vertical spaced relation corresponding to the height of the punched portion. After this punched edge portion of the strip 85 has been assembled with the ribbons the cutter bars 111 and 105 coact to sever said strip into a finished cross bar 116. During this severance, the end parts of said cross bar engage against the guides 81ᵃ on the platform 81 to prevent the flexing forward of said cross bar under the action of the cutter bars during the severance. After one cross bar has been severed from the strip another is fed into position and then severed as before, all as best shown in Fig. 12, the ribbons 40 advancing step by step. The pawl and ratchet feed for the rolls 87 and 88 is so arranged however, that when the portion 43 of the ribbons 40 enters the space between the guide blocks 80 and 83 the pawl 100 is clicking back over the ratchet 98 and said feed rolls remains passive and inoperative to feed the cross bar strip 85 and said ribbons are then severed along the line 43ᵃ before mentioned in a manner now to be described.

Associated with the plate 79 which forms the stationary part of the ribbon severing means, is a coacting removable cutter bar 117. Each cutter bar which is provided with a cutting edge 117ᵃ at its top end to coact with the slot 79ᵃ in an associated plate 79, is pivoted at a point between its ends by a stud bolt 118 to said plate 79 and block 78. A tension spring 119 is interposed between said bar and a nut and washer 119ᵃ on said bolt to maintain proper shearing coaction between said parts. The bottom end of each cutter bar is connected by a bolt and slot adjustable arrangement 120 with a transversely extending trip bar 121. That end of this bar adjacent the hollow upright member 63 is pivotally connected as at 122 with a downwardly extending arm 123 fixed on a sleeve 124 that is rotatively mounted on a longitudinal shaft 125. Said shaft is located a short distance above the bed plate 49 and is supported at its front end by a bracket 125ᵃ on the bed 4. In the upright hollow member 63 is fixed an inwardly extending horizontal stud 126 to overhang the shaft 125. Loose on said stud 126, is a ratchet wheel 127 and also loose on said stud is a rocker plate 128. Said plate carries a spring pressed pawl 129 to engage with the teeth of the ratchet and rocking movement is imparted to said plate by a link 130 operatively connected at one end to said plate and at its other end to the stud 107ᶜ on the sleeve 107ᵃ before mentioned. The rocker plate and ratchet are held on said stud 126 against displacement by a suitable nut and washer as best shown in Fig. 9. Projecting inwardly from said ratchet is a stud 131 adapted in the rotation of the ratchet to engage a roller 132 on a second and upwardly extending arm 133 on the sleeve 124 carrying the arm 123. A spring 134 connected at one end to the bar 121 and at the other end to the hollow upright member 62 holds the roller 132 in engagement with the face of the ratchet 127 and when the stud 131 engages said roller it rocks the arms 133—123 which pull on the bar 121 against the action of the spring 134. This causes the cutter bars 117 to swing in a manner so that each cutting edge 117ᵃ swings across the face of the plate 79 and severs the ribbon strips 40—40 and the finished box partition falls off the platform 81 onto a table 135 at the rear end of the machine where they are removed for use or shipment.

In the cross member 64, suitable openings are provided through which the connecting rods 108 and rocker arm 130 pass, all as best shown in Fig. 8.

My improved machine has many advantages. It may be readily adjusted to produce box partitions of different heights as well as partitions wherein the number of ribbons and cross bars together with the distances of intersection, may be readily made up without requiring a dismantling of the machine to substitute different sets of feed rolls for different sizes of partitions. The punches and dies may be quickly adjusted into the desired position, and the other mechanisms readily coordinated therewith.

The machine is accurate in punching and assembling the various ribbons and cross bars and in severing the same when necessary. It requires no further watching after once set and started further than to see that a sufficient supply of strips is provided and that the finished partitions are moved from the table, at the rear of the machine.

While in describing my invention, I have referred in detail to the construction and arrangement as well as to the forms of the various parts thereof, the same is to be considered as by way of illustration only and not by way of limitation except as may be pointed out in the appended claims.

I claim as my invention:—

1. A machine of the kind described embodying therein, a pair of feed roll shafts, a bearing box for each shaft, guide ways for said boxes and including a part with an angular leg, an adjustable stop in each guide way for one box therein, a pin in said guideway engaging the other box therein and extending toward said leg, and a device adapted to bear against said pin and leg for moving said other box toward the first mentioned box.

2. A machine of the kind described embodying therein, a pair of feed roll shafts, a bearing box for each shaft, guide ways for said boxes, and including a part with an angular leg, an adjustable stop in each guideway for one box therein, a pin in said guideway engaging the other box therein and extending toward said leg, a rotative shaft interposed between said pin and leg and cams on said shaft operative as the shaft is turned to engage said pin and leg to move said other box toward the first mentioned box.

3. A machine of the kind described embodying therein a box like structure including top, bottom and side walls, a horizontal drive shaft in said structure, a block longitudinally adjustable of said top wall, an upright feed roll including a shaft journalled therein and extending thereabove, means providing a driving connection between said shafts, irrespective of the position of said block, an upright ribbon guide plate longitudinally adjustable on one of said side walls in accordance with the position of said feed roll shafts.

4. A machine of the kind described embodying therein a box like structure including top, bottom and side walls, a horizontal drive shaft in said structure, a block longitudinally adjustable of said top wall, an upright feed roll including a shaft journalled therein and extending thereabove, means providing a driving connection between said shafts, irrespective of the position of said block, a second block longitudinally adjustable in said top wall parallel with the first mentioned block, an upright ribbon guide plate pivoted at one end to said second mentioned block and carrying a roller at its other end engaged with said upright feed roll shaft, means urging said guide plate toward said feed roll shaft, and a ribbon severing means longitudinally adjustable on one of said side walls in accordance with the position of said feed roll shaft.

5. A machine of the kind described embodying therein a box like structure including top, bottom and side walls, a horizontal drive shaft in said structure, a groove in said bottom wall parallel with said shaft, a gear adjustable on said shaft, a bearing box in said groove and adjustable therein, an upright shaft journalled in the bearing box, a gear on said upright shaft meshing with the gear on the horizontal shaft, a block adjustable longitudinally on said top wall and in which said upright shaft also has bearing, a second block adjustable on said top wall, a ribbon guide plate swingable on said second block and including a roller to engage the feed roll shaft, and a ribbon severing means longitudinally adjustable on one of said side walls in accordance with the position of said feed roll shaft.

6. A machine of the kind described embodying therein a box like structure, a ribbon feed roll adjustable longitudinally thereof, a plate also longitudinally adjustable on said structure and providing one part of a ribbon severing device, spaced ribbon guides movable with said plate and a swinging blade also pivoted on said plate and adapted to cooperate with said plate to sever said ribbon.

7. A machine of the kind described embodying therein a box like structure, a ribbon feed roll adjustable longitudinally thereof, a plate also longitudinally adjustable on said structure and providing one part of a ribbon severing device, spaced ribbon guides movable with said plate, a blade pivoted between its ends on said plate, the top end of said blade coacting with said plate to sever said ribbon, a reciprocating bar and means providing an adjustable pin and slot connection between said bar and the bottom end of said blade.

8. In a machine of the kind described the combination of a box like structure, a longitudinally adjustable vertically arranged plate on said box like structure, a horizontal platform carried by said box like structure and spaced from said plate, guides on said plate and platform for guiding a vertically edgewise disposed ribbon, means for feeding a ribbon through said guides, and means positioned between said guides for severing the ribbon.

9. In a machine of the kind described the combination of a box like structure, a longitudinally adjustable vertically arranged plate on said box like structure, a horizontal platform carried thereby and spaced from said plate, guides on said plate and platform for guiding a vertically edgewise disposed ribbon, means for feeding a ribbon through said guides, cross bar guide tabs on said platform one spaced laterally from each guide thereon and means positioned between said guides on said plate and platform respectively for severing the ribbon.

In testimony whereof, I have thereunto set my hand, this 11th day of May, 1927.

WILLIAM E. BECK.